Sept. 28, 1948.  P. E. CATE  2,450,120
METHOD AND APPARATUS FOR BONDING THIN
SECTIONS TO HEAVIER MEMBERS
Filed Sept. 27, 1944
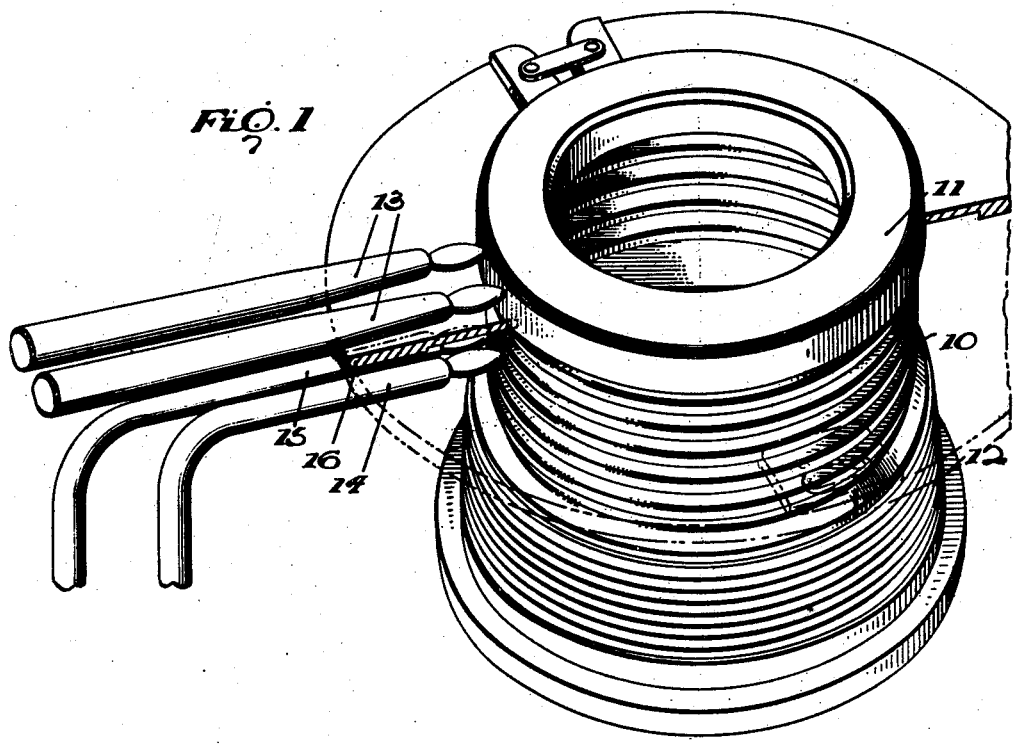
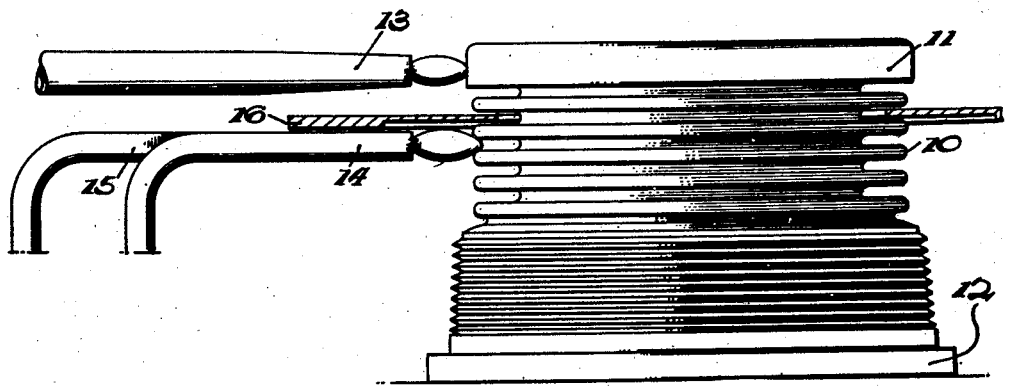
Inventor
Paul E. Cate.
By Cameron, Kerkam & Sutton.
Attorneys Patented Sept. 28, 1948

2,450,120

UNITED STATES PATENT OFFICE 2,450,120

METHOD AND APPARATUS FOR BONDING THIN SECTIONS TO HEAVIER MEMBERS

Paul E. Cate, Knoxville, Tenn., assignor to Robertshaw-Fulton Controls Company, a corporation of Delaware Application September 27, 1944, Serial No. 556,010

8 Claims. (Cl. 113—59)

This invention relates to a method and apparatus for soldering, brazing or welding thin walled structures to members of materially heavier construction, and while applicable widely to the uniting of two members which differ substantially in wall thickness, the present invention has particular utility when applied to uniting relatively thin resilient metal elements, such as bellows, at an end to other members which are relatively thick when compared with the thickness of the metal of the bellows or the like.

A bellows is ordinarily formed from relatively thin metal having a thickness on the order of a few thousandths of an inch, and the procedures commonly employed in the formation of bellows are such as to intentionally cold work the metal so that it will be possessed of considerable inherent resiliency. Grave difficulty has heretofore been encountered in soldering this thin resilient metal to a relatively heavy end member, for example, without the heat used in soldering effecting a considerable annealing of the metal of the bellows in the neighborhood of the soldered joint.

In order to sufficiently heat the relatively heavy member so as to assure a fluid-tight joint by the soldering, brazing or welding operation employed, the quantity of heat needed has made it extremely difficult to avoid heat flow into the relatively thin metal of the bellows to such an extent as to remove much of the temper in the bellows metal adjacent the joint. Heretofore it has been the practice to immerse the bellows in a water bath while soldering or brazing, but this has not proved entirely satisfactory because too much heat is dissipated from the surfaces where the soldering or brazing operation is being performed, and furthermore because such soldering or brazing in a water bath is a slow and cumbersome operation.

It is an object of this invention to provide a method and apparatus for soldering, brazing or welding relatively thin metal sections to relatively thick metal sections which will avoid annealing of or other injury to the thin metal sections.

Another object of this invention is to provide a method and apparatus of the type characterized which will enable much faster production of such soldered, brazed or welded joints than has heretofore been obtainable.

Another object of this invention is to provide a method and apparatus for soldering, brazing or welding relatively thin metal to materially thicker metal which will enable an adequate quantity of heat to be supplied to the relatively thick member to assure the formation of a fluid-tight joint without injury to the metal of the thin section.

Another object of this invention is to provide a method and apparatus of the type characterized which are simple, expeditious and efficient.

Other objects will appear as the description of the invention proceeds.

The invention is capable of being practiced in a variety of ways and with apparatus of varying constructions, as will hereinafter be apparent to those skilled in the art, but for purposes of illustrating the invention one apparatus and procedure are shown on the accompanying drawings. It is to be understood, however, that the drawings are for purposes of illustration only and are not to be construed as a definition of the limits of the invention, reference being had to the appended claims for that purpose.

Referring to the accompanying drawings wherein the same reference characters are used to designate corresponding parts in the figures:

Fig. 1 is a perspective view illustrating the procedure and apparatus of the present invention; and Fig. 2 is a side view of the apparatus of Fig. 1.

The drawings show a conventional bellows at 10 to which is to be attached at one end a heavy end piece or seal nose 11 and at its opposite end a second relatively heavy end piece or retainer ring 12. The invention is shown as applied in attaching the end piece 11 to the bellows 10, but it will be understood that the invention may be used with equal facility in attaching any suitable end member to a bellows or other thick metal piece to a section of thin metal.

In conformity with the present invention a suitable heating means, here shown as in the form of an oxyacetylene blowtorch 13, is mounted in position for play on the relatively heavy member 11. On that side of the oxyacetylene flame at which the bellows 10 is to be disposed, and in substantially axial alignment with the torch 13, is a steam jet 14 and an air jet 15, and interposed between the torch and the air and steam jets is a baffle plate or shield 16 to prevent spreading of the torch flame in the direction of the bellows. For bellows work said baffle or shield preferably takes the form of an annular member composed of suitably hinged sections so that, as shown, it may readily embrace a bellows within the reentrant space of an inwardly directed corrugation. The torch, jets and baffle may be coordinated into a convenient unit in any suitable way so as to retain the parts in the relationship specified and to facilitate the mounting thereof.

The bellows with its end piece to be soldered, brazed or welded thereto is mounted on a slowly revolving stand and the flame of the torch 13 is aligned with the relatively heavy member so as to play on the edge thereof and heat the same to the proper soldering temperature. Throughout the operation of the torch 13 steam under relatively low pressure is caused to impinge on the thin metal of the bellows in conjunction with the air emerging from the air jet, the steam and air commingling in contact with the bellows wall in immediate adjacency to the flame of the torch and in substantially axial alignment with the area of the end piece being heated by the flame.

Experience has demonstrated that where steam under relatively low pressure is thus used with an air jet impinging on the thin metal in immediate adjacency to the area where the thick metal is being heated, the latter may be readily supplied with sufficient heat to assure that the soldered, brazed or welded seam or joint being formed is fluid-tight without injury to or annealing of the thin metal of the bellows wall, the cooling effect of the combined steam and air, acting on the thin metal in an area immediately adjacent the flame-heated portion of the thick member, being sufficient to maintain the thin metal below the temperature at which material annealing will occur while there is no such dissipation of heat as to prevent the thick member being raised to the desired temperature for effecting a superior soldered, brazed or welded joint. Thus, by way of illustration and not of limitation, in the attachment of a heavy end piece of steel to a bellows of 80–20 brass, it is desirable in order to obtain a fluid-tight joint to use a bonding temperature of approximately 1350° to 1400° F., while experience has demonstrated that changes which are detrimental to the material of the bellows begin to take place at a temperature of approximately 600° F. With an oxyacetylene torch as before referred to the temperature of the flame is on the order of 2950° to 3050° F. Practicing the invention in conformity with the foregoing disclosure with an air jet whose temperature is on the order of 75° to 80° F. and a steam jet whose temperature is on the order of 225° to 235° F., the steel end piece or nose may be heated to assure a fluid-tight seal without injury to the thin metal of the bellows wall.

Thus the present method and apparatus avoid the slow and cumbersome procedures heretofore in use, eliminate the difficulty heretofore experienced because of undue dissipation of heat, and assure that a superior soldered, brazed or welded joint can be produced without injury to or annealing of the metal of thin section in adjacency thereto.

I am aware that various methods and procedures have heretofore been suggested wherein a soldering flame is associated with means for impinging air or the like on the seam after it is formed so as to more rapidly dissipate the heat and accomplish the chilling of the soldered seam, but the present invention is to be sharply differentiated from such prior methods and procedures because the air and steam jets do not operate to chill the formed seam but, operating simultaneously with the flame that is effecting the soldering, brazing or welding operation, prevent such a heating of the thin metal as to cause loss of the temper therein or to injure from overheating the thin section while retarding heat dissipation so that an adequate quantity of heat may be supplied to the relatively thick member to assure the desired soldering, brazing or welding temperature for producing the desired fluid-tight joint.

While the present invention has been shown as applied to the soldering, brazing or welding of a bellows to a relatively thick member, the invention is not limited thereto, as will now be apparent to those skilled in the art, because the invention is also applicable to the uniting of diaphragms and other thin metal sections to relatively thick members of any suitable character, and also wherever it is desired to avoid injury to a relatively thin metal section whether or not loss of temper is involved.

While the embodiment of the present invention illustrated on the drawings has been described with considerable particularity, it will be apparent to those skilled in the art that the invention is not restricted thereto, as the invention is capable of receiving a variety of expressions, and changes may be made in the details of construction and arrangement of the parts of the apparatus, without departing from the spirit of this invention. Reference is therefore to be had to the appended claims for a definition of said invention.

What is claimed is:

1. In a method of soldering, brazing or welding a bellows of relatively thin section to a member of relatively thick section without annealing the metal of the bellows, slowly rotating the bellows and member to be united thereto while applying a heating flame to said member, confining said heating flame against spreading to the bellows metal and jetting onto the metal of the bellows in immediate adjacency to said heating flame a fluid whose temperature is on the order of the temperature of low pressure steam to maintain the temperature of the bellows metal below an annealing temperature.

2. In a method of soldering, brazing or welding a metal of relatively thin section to a metal of relatively thick section, applying a heating flame to the metal of relatively thick section while confining the flame against spreading to the metal of relatively thin section and jetting onto the metal of relatively thin section immediately adjacent the area subjected to said heating flame a heated fluid whose temperature is on the order of the temperature of low pressure steam.

3. In a method of soldering, brazing or welding a metal of relatively thin section to a metal of relatively thick section, applying a heating flame to the metal of relatively thick section while confining the flame against spreading to the metal of relatively thin section and subjecting the metal of thin section in immediate adjacency to the area heated by said heating flame to a fluid having a temperature on the order of low pressure steam by applying thereto jets of air and steam to retain the thin metal at a temperature below that at which said thin metal is annealed.

4. In a method of soldering, brazing or welding a bellows of relatively thin section to a member of relatively thick section without annealing the metal of the bellows, slowly rotating the bellows and member to be united thereto while applying a heating flame to said member, confining said heating flame against spreading to the bellows metal, and subjecting the bellows metal immediately adjacent to the area heated by said heating flame to the combined action of jets of steam and air to retain the temperature of the bellows metal below that at which said bellows metal is annealed.

5. In an apparatus for soldering, brazing or welding a bellows of relatively thin metal to a member of relatively thick metal, the combination of a torch for impinging a heating flame directly on the relatively thick member, a baffle adjacent said torch and on the side thereof toward the bellows to prevent spreading of the torch flame, and at least one nozzle adjacent said baffle but on the opposite side thereof from said torch for applying a jet of fluid whose temperature is on the order of the temperature of low pressure steam to the bellows metal.

6. In an apparatus for soldering, brazing or welding a bellows of relatively thin metal to a member of relatively thick metal, the combination of a torch for impinging a heating flame directly on the relatively thick member, a baffle adjacent said torch and on the side thereof toward the bellows to prevent spreading of the torch flame, and nozzles for applying jets of low pressure steam and air on the order of atmospheric temperature to the bellows metal mounted on the opposite side of said baffle from said torch but in immediate adjacency to said baffle and in substantial alignment with said torch.

7. In an apparatus for soldering, brazing or welding metal of relatively thin section to metal of relatively thick section, the combination of a torch for applying a heating flame to the relatively thick metal, a baffle adjacent said torch for preventing spreading of the torch flame, and at least one nozzle for applying fluid whose temperature is on the order of the temperature of low pressure steam to the relatively thin metal and mounted on the opposite side of said baffle from said torch but in immediate adjacency thereto.

8. In an apparatus for soldering, brazing or welding metal of relatively thin section to metal of relatively thick section, the combination of a torch for applying a heating flame to the relatively thick metal, a baffle adjacent said torch for preventing spreading of the torch flame, and nozzles for applying jets of steam and air whose combined temperatures do not exceed the temperature of low pressure steam to the relatively thin metal, said nozzles being mounted on the opposite side of said baffle from said torch but in immediate adjacency thereto and in substantial alignment with said torch.

PAUL E. CATE.

REFERENCES CITED

The following references are of record in the file of this patent:

UNITED STATES PATENTS

| Number | Name | Date |
| --- | --- | --- |
| 1,450,452 | Randall | Apr. 3, 1923 |
| 1,615,591 | Mallory | Jan. 25, 1927 |
| 1,828,977 | Miller | Oct. 27, 1931 |
| 2,039,217 | Goddard | Apr. 28, 1936 |
| 2,106,987 | Powell | Feb. 1, 1938 |
| 2,314,950 | Pope | Mar. 30, 1943 |
| 2,325,113 | Craig | July 27, 1943 |
| 2,396,956 | Larson | Mar. 19, 1946 |